US008228173B2

(12) United States Patent
Missimer et al.

(10) Patent No.: US 8,228,173 B2
(45) Date of Patent: Jul. 24, 2012

(54) INTERROGATING RADIO FREQUENCY TAGS

(75) Inventors: David Ross Missimer, Raleigh, NC (US); Thomas J. Frederick, Chapel Hill, NC (US); George D. Cruickshanks, Raleigh, NC (US); Steven C. Lin, Chapel Hill, NC (US)

(73) Assignee: Sirit Inc., Toronto, Ontario (CA)

( * ) Notice: Subject to any disclaimer, the term of this patent is extended or adjusted under 35 U.S.C. 154(b) by 962 days.

(21) Appl. No.: 11/767,378

(22) Filed: Jun. 22, 2007

(65) Prior Publication Data

US 2008/0150692 A1 Jun. 26, 2008

Related U.S. Application Data

(60) Provisional application No. 60/815,769, filed on Jun. 22, 2006.

(51) Int. Cl.
  *H04Q 5/22* (2006.01)
(52) U.S. Cl. ............... 340/10.2; 340/5.92; 340/10.1; 340/10.3; 340/10.33
(58) Field of Classification Search ............ 340/10.2, 340/10.1, 10.3, 10.33, 5.92; 235/492, 375, 235/376, 385, 435, 436
  See application file for complete search history.

(56) References Cited

U.S. PATENT DOCUMENTS

| 2005/0280505 | A1 | 12/2005 | Humes et al. | |
| 2006/0071759 | A1* | 4/2006 | Cooper et al. | 340/10.2 |
| 2006/0077040 | A1* | 4/2006 | Bormaster | 340/10.2 |
| 2006/0145815 | A1* | 7/2006 | Lanzieri et al. | 340/10.2 |
| 2006/0267730 | A1* | 11/2006 | Steinke et al. | 340/10.1 |
| 2007/0126555 | A1* | 6/2007 | Bandy | 340/10.2 |
| 2008/0018431 | A1* | 1/2008 | Turner et al. | 340/10.2 |

FOREIGN PATENT DOCUMENTS

| EP | 0905640 | 3/1999 |
| EP | 0924635 | 6/1999 |
| GB | 2410867 A * | 8/2005 |

OTHER PUBLICATIONS

Invitation to Pay Additional Fees and Partial International Search Report issued in International Application No. PCT/US2007/071936; Dec. 28, 2007; 5 pages.
International Search Report and Written Opinion of the International Searching Authority issued in counterpart International Application No. PCT/US2007/071936; Feb. 29, 2008; 14 pages.

(Continued)

*Primary Examiner* — Albert Wong
*Assistant Examiner* — Peter Mehravari
(74) *Attorney, Agent, or Firm* — Fish & Richardson P.C.

(57) ABSTRACT

The present disclosure is directed to a system and method for interrogating radio frequency tags. In some implementations, a method includes A method includes successively polling, for a specified number of inventory cycles, a plurality of Radio Frequency Identification (RFID) tags in a first state. At least a first subset of the plurality of RFID tags transitions from the first state to a second state in response to the poll. After the specified number of inventory cycles, a command is transmitted to update at least a second subset of the plurality of RFID tags from the second state to first state. The plurality of RFID tags are subsequently polled after transmitting the update command.

6 Claims, 3 Drawing Sheets

OTHER PUBLICATIONS

Jeffrey E. Wieselthier, Anthony Ephremides, and Larry A. Michaels, "An Exact Analysis and Performance Evaluation of Framed ALOHA with Capture", *IEEE Trans. on Communications*, vol. 37, No. 2, Feb. 1989, (13 pages).

Frits C. Schoute, "Dynamic Frame Length ALOHA", *IEEE Trans. on Communications*, vol. 31, No. 4, Apr. 1983 (4 pages).

Jie Luo and Anthony Ephremides, "On the Throughput, Capacity, and Stability Regions of Random Multiple Access", *IEEE Trans. on Information Theory*, vol. 52, No. 6, Jun. 2006 (15 pages).

Theodore S. Rappaport, *Wireless Communications*, Prentice Hall, 1996.

International Preliminary Report on Patentability issued in corresponding International Application No. PCT/US2007/071936 dated Oct. 1, 2008; 16 pages.

* cited by examiner

INTERROGATING RADIO FREQUENCY TAGS

CLAIM OF PRIORITY

This application claims priority under 35 USC §119(e) to U.S. Patent Application Ser. No. 60/815,769, filed on Jun. 22, 2006, the entire contents of which are hereby incorporated by reference.

TECHNICAL FIELD

This invention relates to detecting Radio Frequency (RF) signals and, more particularly, to interrogating radio frequency tags.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The present disclosure is directed to a system and method for interrogating radio frequency tags. In some implementations, a method includes A method includes successively polling, for a specified number of inventory cycles, a plurality of Radio Frequency Identification (RFID) tags in a first state. At least, a first subset of the plurality of RFID tags transitions from the first state to a second state in response to the poll. After the specified number of inventory cycles, a command is transmitted to update at least a second subset of the plurality of RFID tags from the second state to first state. The plurality of RFID tags are subsequently polled after transmitting the update command.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
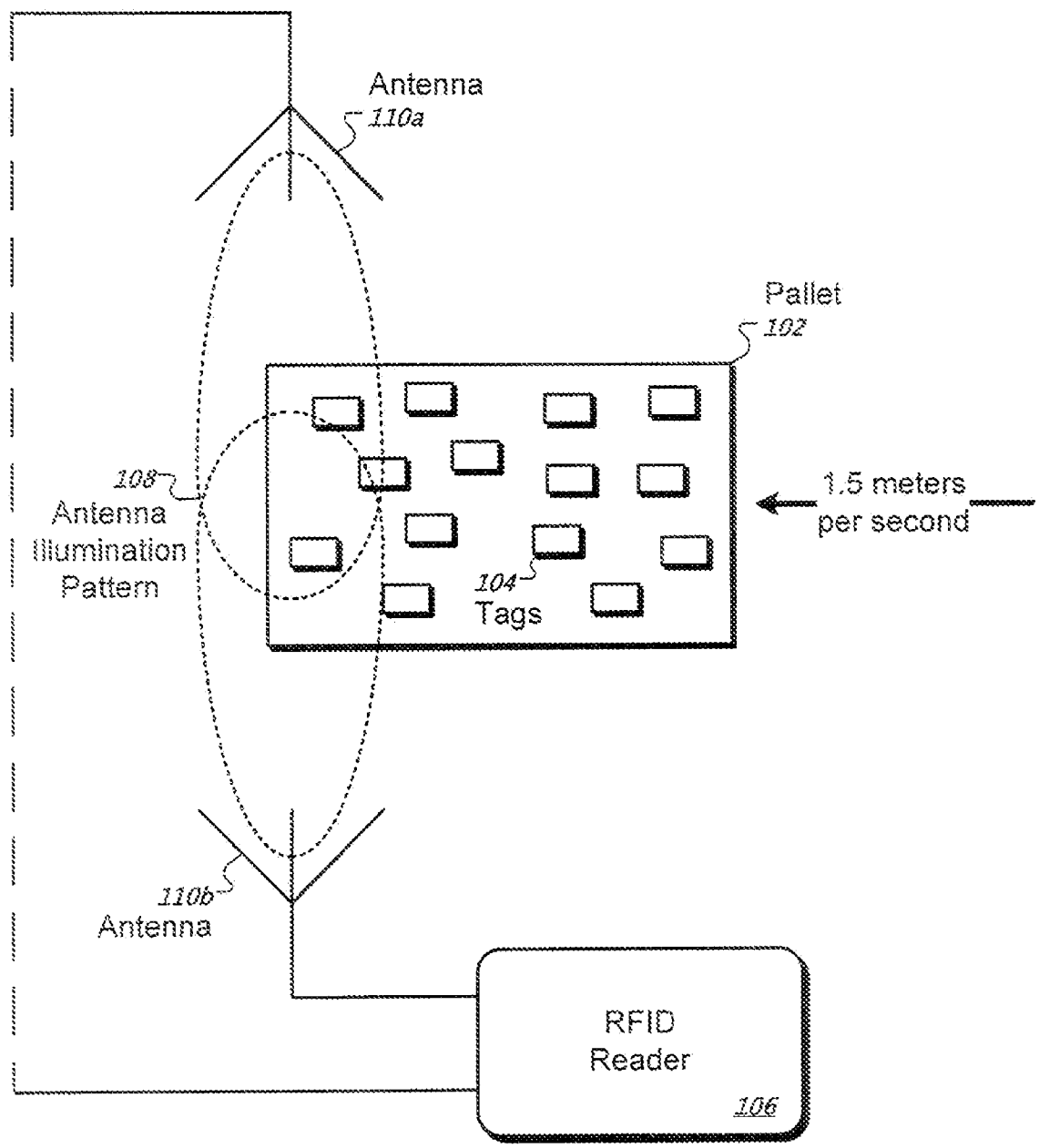
FIG. 1 is a block diagram illustrating an example interrogation system in accordance with some implementations of the present disclosure.

FIG. 1 is an example interrogation system 100 for identifying Radio Frequency IDentification (RFID) tags moving through an interrogation zone in accordance with some implementations of the present disclosure. For example, the system 100 may successively execute a specific singulation algorithm suited for identifying a high volume of tags then periodically update the state of tags in the interrogation zone to increase reliability of the system 100. In general, RFID tags may be assigned or otherwise include a state, which, in some examples, can be used to determine whether an associated RFID tag has been previously queried for information. For example, ISO-C (or EPC Global Class-1 Generation-2) tags contain four separate session memory bits (flags) which can be in one of two states, "A" or "B." To update tag states, the interrogation system 100 can, in some implementations, dynamically switch between singulation algorithms. Alternatively or in combination, the system 100 may update tag states by periodically transmitting commands to the RFID tags in the interrogation zone after a certain number of cycles of a specific singulation algorithm. In either case, the system 100 dynamically updates the tag states based, at least in part, on the motion of the tags and the beamwidth of the reader to enhance, maximize, or otherwise increase read accuracy and/or read redundancy. In some implementations, read accuracy can include the percentage of tags passing through the interrogation zone that are read by the system 100. In some implementations, read redundancy can include how many times each tag is read. In this case, confidence that a tag actually passes through an interrogation zone typically increases as the read redundancy increases.

At a high level, the system 100, in some implementations, includes a pallet 102 containing, including, or otherwise transporting RFID tags 104. The pallet 102 can, in some implementations, include several hundred tags 104. The RFID tags 104 are communicatively coupled to an RFID reader 106 through an interrogation zone 108 and antennas 110a and 110b. The system 100 may include more or less than two antennas (e.g., 4) to read the tags 104 without departing from the scope of this disclosure. In addition, the antennas 110 may be in any number of configurations and orientations such as left and right, up and down, and/or others. From a high level of operation, the pallet 102 including the RFID tags 104 moves through the interrogation zone 108 at a certain rate (e.g., 1.5 m/s). The pallet 102 generally moves at a rate between 1 meter per second (m/s) to 2 m/s. The RFID reader 106 transmits queries and/or commands using the antennas 110 to the moving tags 104 using the interrogation zone 108. As the pallet 102 moves through the interrogation zone 108, the RFID tags 104 may respond to received queries and/or commands. For example, the RFID tags 104 may transmit information including associated identifiers to the RFID reader 106. In some implementations, the system 100 uses thirty degree aperture antennas 110 and two meter wide portals with pallets 102 moving at 1.5 meters per second which can result in tags 104 being visible to a particular antenna for half a second or less. The reader 106 may determine a number of parameters to dynamically update tag states. For example, the reader 106 may determine one or more of the following: tag motion, estimated new tag volume, estimate total tag volume, number of cycles of a singulation algorithm, frame size, and/or others. Although the system 100 illustrates a supply chain pallet and dock door portal, the invention is equally applicable to manufacturing conveyor belts where tagged items move at several meters per second through the interrogation zone, or automatic vehicle identification systems where tagged automobiles move at 50 meters per second or more through the interrogation zone.

In some applications the system 100 may be subject to large scale and small scale RF fading. In some implementations, large scale fading can be due to limited antenna beamwidth and tag movement through the antenna beam. Large scale fading is the change in nominal RF field power that the tag 104 experiences as is passes through the interrogation zone 108. In some implementations, small scale fading is due to multipath propagation. The moving tag 104 may experience RF "nulls", i.e., places where the RF signal energy from the reader drops significantly due to cancellation between multiple propagation paths. On average, these small scale fading nulls are typically spaced at the RF carrier wavelength divided by 2. For an example, the RFID reader 106 may cover an interrogation zone 108 with M antennas. If the tags 104 are moving through the interrogation zone 108 at S meters per second, then the reader 106 initiates, in some implementations, one or more inventory cycles on each of the M antennas in the time it takes a tag to move a wavelength divided by 2, or the typical null-to-null spacing for small scale fading. For example, the pallets 102 can move through the dock door portals at S=1.5 meters per second. When the RF carrier of the reader 106 is 900 MHz, the typical null-to-null duration can be 100 milliseconds. For a reader 106 with M=4 antennas, the reader 106 can initiate one or more inventory frames on each antenna 110 within that 100 millisecond period. In yet another example, consider an automatic vehicle identification system, wherein the interrogation zone 108 is covered by M=1 antenna and the tags 104 are moving through the interrogation zone at 50 m/s. In this case the null-to-null period is 3 milliseconds, and so the reader 106 can try to complete one or more inventory frames in 3 milliseconds.

Turning to a more detailed description of the system 100, the RFID tags 104 can include any software, hardware, and/or firmware configured to wirelessly receive and transmit information using RF. For example, the RFID tags 104 may store one or more parameters such as, for example: an identifier, an inventory state, a slot number for transmitting within an inventory frame, as well as other parameters. In the case that the RFID tags 104 operate in accordance with ISO-C (or EPC Global Class-1 Generation-2), such tags 104 can contain four separate session memory bits, called Inventory flags, which can be in one of two states, "A" or "B". In this case, if such tags 104 have been powered down for some period of time, the flags are often initialized to the A state. In response to a query type command, for example, query, query repeat, or query adjust, the RFID tags 104 can transmit stored information such as an identifier. In some implementations, the query may include one or more of the following: a frame size which can be specified using a Q parameter, a target state, and/or other information such as a session number or return link modulation parameters. As mentioned above, Gen2 tags have inventory flags for each session which take on one of two states: A or B. In the case that the query specifies a target state, the RFID tags 104 with session inventory flag set to that target state participate in the frame or otherwise respond to the query. In transmitting information to the reader 106, the RFID tag 104 can, in some implementations, randomly select a time slot between 0 and $2^Q-1$ for transmitting the response, in addition, the RFID tags 104 can, in some implementations, update one or more parameters in response to at least a command. For example, the RFID tag 104 may update from a first state (e.g., A state) to a second state (e.g., B state) in response to an inventory frame. In some implementations, the RFID tag 104 transmits an associated EPC in an inventory frame and, in response to some type of acknowledgement from, the reader 106, toggles an inventory flag, i.e., changes the inventory flag state from, for example, A to B, or vice versa, depending on its initial state. In some protocols 106 the acknowledgement can be an explicit acknowledge command from the reader; or the acknowledgement can be implicit in the form of a valid command within a specified period of time.

In some implementations, the RFID tags 104 may operate independent of an internal power supply, using the RF field from the reader for power. The Gen2 protocol requires some stales to be persistent, i.e., these state are preserved across brief losses of RF power due to large scale or small scale fading. Gen2 tags actually have four session inventory flags to facilitate being read by different readers. Several of the session inventory flags have this persistence property, allowing them to maintain their A or B state for up to several seconds without RF power.

The RFID reader 106 can include any software, hardware, and/or firmware configured to wirelessly communicate with the RFID tags 104 through the interrogation zone 108. For example, the RFID reader 106 may transmit a request to RFID tags 104 in the interrogation zone 108. As mentioned above, the request may include one or more of the following: a frame size which can be specified using a Q parameter, a target state, and/or other information. Prior to transmitting the request, the RFID reader 106 may dynamically adjust the inventory frame based, at least in part, on one or more parameters. For example, the reader 106 may dynamically adjust the inventory frame based, at least in part, on an estimate number of new tags 104 and an estimated total number of tags 104. As discussed in more detail below, these estimates may be based on the results of previous inventory cycles. In response to at least the transmitted request, the reader 106 receives information identifying one or more of the tags 104. For example, the reader 106 may identify unique ID numbers, i.e., electronic product code (EPC), for the responding tags 104 based, at least in part, on the responses. In some implementations, the reader 106 receives the responses over a single shared half duplex two-way wireless communications channel. In this implementation, the reader 106 uses a multiple access communications protocol to identify the responding tags 104. In other words, the system 100 uses a communications protocol designed to allow the single wireless communications channel to be used by the plurality of tags 104. Such communication protocols include the following: tree searching algorithms, ALOHA type algorithms, and other algorithms. While the system 100 is described with respect to framed ALOHA algorithms, the system 100 may use some, all, or none of the described aspects without departing from the scope of this disclosure.

In framed ALOHA, the communications channel in system 100 can, in some implementations, be divided into frames that are subdivided into q time slots. In this implementation, the reader 106 can control the start time of the frames and of each slot within the frame. As mentioned above, the tags 104 can randomly select a slot for a response, so the reader 106, in this case, identifies information included in the response slots. The reader 106 may determine one or more of the following based on the response slots: no tags 104 have chosen the slot because it is empty, one tag has chosen the slot because of included identification information (e.g., EPC), more than one tag has chosen the slot because of a collision, as well as others. In the case of a successful transmission, the reader 106 can transmit an acknowledgement to the associated tag 104.

For example, the acknowledgement may include data indicating successful transmission. In the case of a collision, the reader 106, in some implementations, may not transmit an acknowledgement. As mentioned above, the reader 106 may dynamically adjust the frame size q based, at least in part, on the number of new tags 104 entering the interrogation zone 108. In addition, the reader 106 may adjust the frame size based on the speed of the slots, i.e., the speed of the communications link. In some implementations, a large frame size can result in a large number of empty slots and, in turn, a longer time to singulate the tags 104 in the interrogation zone 108. In comparison, a small frame size may result in a large number of collisions and, in turn, a long time to singulate the tags 104.

In some implementations, the reader 106 can use a combination of singulation algorithms to query the tags 104 in the interrogation zone 108. For example, the reader 106 can use a combination of ABA singulation and A only singulation to identify the tags 104. In regards to ABA singulation, this mode singulates tags 104 in the Interrogation zone 108 from the A state to the B state, then singulates the tags 104 from the B state to the A state. The process is repeated. Tags 104 that may have been spuriously read at another read point or otherwise have their inventory tags set to B can be read using the ABA algorithm which includes both A and B targets. In regards to A only singulation, this mode only singulates from one state to a different state such as from the A state to the B state. During this mode, read tags 104 transition to the second state (e.g., B state) and can remain out of the inventory frames from that point forward (until they are reset by limited persistence or through a reader command). By removing tags 104 from succeeding inventory frames, the size of the inventory rounds can be reduced. In some cases, the reader 106 can singulate tags 104 that are very weakly illuminated by the interrogation zone 108 and/or are only illuminated for a very brief period of time (e.g., 50 ms). For example, such tags 104 may be at least partially enclosed in RF absorptive material or at least partially behind RF reflective material.

As mentioned above, the reader 106 can use a combination of the A only singulation and the ABA singulation to maximize, enhance, or otherwise increase read accuracy and read redundancy. For example, the reader 106 may transmit successive frames in accordance with the A only singulation and, after a specified number of frames, transmit an inventory frame for the B state. In this case, the reader 106 can, in some implementation, detect at least a portion, of the tags 104 that are weakly illuminated as well as tags that enter the interrogation zone in the second state. By combining the A-only mode and the ABA mode, the reader 106, in some implementations, jointly optimizes tag read accuracy and redundancy by dynamically switching between the modes. In other words, the reader 106, in this implementation, adaptively adjusts between the ABA singulation algorithm and the A only singulation algorithm. In addition or in combination, the reader 106 may, after a specified number of frames for the A state, issue a command (e.g., select command) that transitions tags in the second state to the first state. In this case, the reader 106 may then continue to transmit inventory frames for the A state. In the Gen2 protocol, the "select" command enables the reader 106 to reset tags 104 that receive the command from the B state to the A state. After updating tag states, the reader 106 can re-singulate the tags 104 from the A state to the B state. In this implementation, the reader 106 can increase read redundancy by periodically issuing this select command. Indeed, the reader 106 can increase read redundancy by controlling how often this command is issued when there is sufficient time on the wireless communications link to do so.

As with the previous section, the reader 106 can, in some implementations, identify those tags 104 that entered the interrogation zone in the second state by transitioning them to the first state. In either example implementation, the reader 106 does not solely execute an "A only" singulation but, in some implementations, achieves read redundancy in proportion to the estimated amount of time available to do extra reads. The combined or otherwise modified algorithms can increase read redundancy above the A only algorithm without resorting to the full overhead of the ABA algorithm. Furthermore, by using a single parameter called the "select period," i.e., the period between switching tag states, the algorithm can allow considerable flexibility.

In the process of identifying tags 104, the reader 106 can, in some implementations, estimate a period of time to complete an inventory frame. For example, given N tags in the interrogation zone 108 with their inventory flags set to the desired inventory target (e.g., A or B), the reader 106 can estimate the amount of time to complete the inventory frame based, at least in part, on one or more parameters (e.g., link data rates, packet lengths). In the case that the reader 106 queries the interrogation zone 108 in accordance with the Gen2 protocol, time durations of the three different slot outcomes can be approximated, i.e., the empty slot time is $T_{empty}$, the successful (EPC read) timeslot is $T_{success}$, and the collision slot time is $T_{collision}$, as follows:

$$T_{empty} = T_{query} + T_1 + T_{RN16} + T_2$$

$$T_{success} = T_{query} + T_1 + T_{RN16} + T_2 + T_{ack} + T_1 + T_{EPC} + T_2$$

$$T_{collision} = = T_{query} + T_1 + T_{RN16}$$

where $T_{query}$ is the average time required for a query repeat or query adjust command, $T_1$ is the average transit-to-receive turn around delay, $T_{RN16}$ is the average time to receive a 16 bit random number packet from the tag, $T_2$ is the average receive-to-transmit turn around delay, $T_{ack}$ is the average time required for an acknowledge command, and $T_{EPC}$ is the average time to receive an EPC packet from the tag. The above equations are for illustration purpose only and the time durations may be determined based on other expressions without departing from the scope of this disclosure. For example, the reader 106, in determining the time durations, may include tolerances in link rates, probabilistic choices between query repeat and query adjust commands, unequal bit durations on the transmit protocol, as well as other information. In addition, the reader 106 may determine the time durations based on "worst case" scenarios in place of "averages."

Continuing with the example, given N tags, the reader 106 can use an estimate of how many empty slots, $N_{empty}$, and collision slots, $N_{collision}$, are associated with successfully reading N tags. In some implementations, these numbers can be functions of the number of tags N and the frame adaptation algorithm employed on the reader. In any case, the estimated frame duration can be determined as follows:

$$T_{frame}(N) = N \cdot T_{success} + N_{empty}(N) \cdot T_{empty} + N_{collision}(N) \cdot T_{collision}.$$

When using the standard "adaptive-Q" frame adjustment algorithm published in the version 1.0.9 Gen2 specification and assuming N is not very small, the empty slots and the collision slots can be determined as follows:

$$N_{empty}(N) \approx N_{collision}(N) \approx N.$$

Given this frame timing estimate the reader can estimate how long it will take to complete inventory cycles on all M antennas. Given the nominal speed of tags 104 through the interrogation zone, the width of the interrogation zone, and the null-to-null small scale fading period, the reader may have an antenna polling period, $T_{goal}$, as an input parameter to the algorithm for which the algorithm optimizes. Given this inventory timing goal and the frame timing estimate the reader can dynamically update the singulation algorithm to try and meet the goal. The reader may adapt the singulation algorithm to try to keep the average number of tags per inventory cycle approximately or less than $N_{goal}$, such that $T_{frame}(N_{goal}) \approx T_{goal}$. In some implementations, the tag volume N needed for the frame timing estimate is not known and can be estimated.

In estimating the expected tag numbers, the reader 106 may use numbers from previous inventory cycles. For example, given the speed of tags 104 moving through the interrogation zone 108, a strong correlation can exist between one inventory frame and the next. Based, at least in part, on this assumption, the reader 106 can estimate the number of tags in the interrogation zone using the total number of unique tags read over the most recent T seconds. In some implementations, T is a design parameter which depends on the expected speed of the tags 104 moving through the interrogation zone 108. In the case that the reader 106 includes multiple antennas 110, the reader 106 can weight the estimation according to which antenna is currently being used.

In sense implementations, the reader 106 may determine a select period based, at least in part, on one or more parameters. For example, the reader 106 may determine the select period using the following two tag volume estimates:

$N_{new}$, the number of new tags 104 the reader expects in the interrogation zone 108 since the last inventory frame started, and $N_{total}$, the total number of tags 104 in the interrogation zone 108 which would respond if a select command were issued.

The number of new tags in the field can be estimated using the number of tags that have been inventoried in the most recent A only inventory frames. In some implementations, the reader 106 uses the following formula to determine a select period P if $N_{new}$ is smaller than $N_{goal}$:

Select period $P=(N_{total}-N_{new})/(N_{goal}-N_{new})$.

If $N_{new}$ is greater than or equal to $N_{goal}$, then the select period is, in some implementations, set indefinitely long. The illustrated formula is for example purposes only and the reader 106 may use some, none, or a different formula to determine a select, period without departing from the scope of this disclosure. Indeed, the reader 106 may use any number of expressions to determine the select period. For example, the select period can be set such that "on average" the target antenna polling period is satisfied. Alternatively or in combination, the reader 106 can set the select period such that the target antenna polling period is absolutely met (based on tag volume estimates and inventory frame period estimates). Furthermore, if the $T_{frame}(N_{total})$ is short enough to satisfy the target antenna polling period using ABA singulation, then the reader 106 can revert back to this inventory algorithm to maximize read redundancy. For example, in a distribution center portal environment where the pallets 102 are moved through the dock door portals at S=1.5 meters per second and the antenna beamwidth covers about 1 second of tag trajectory, then the reader 106 can use the total number of unique tags 104 read over the past 500 milliseconds as a tag volume estimate.

Figure 2:
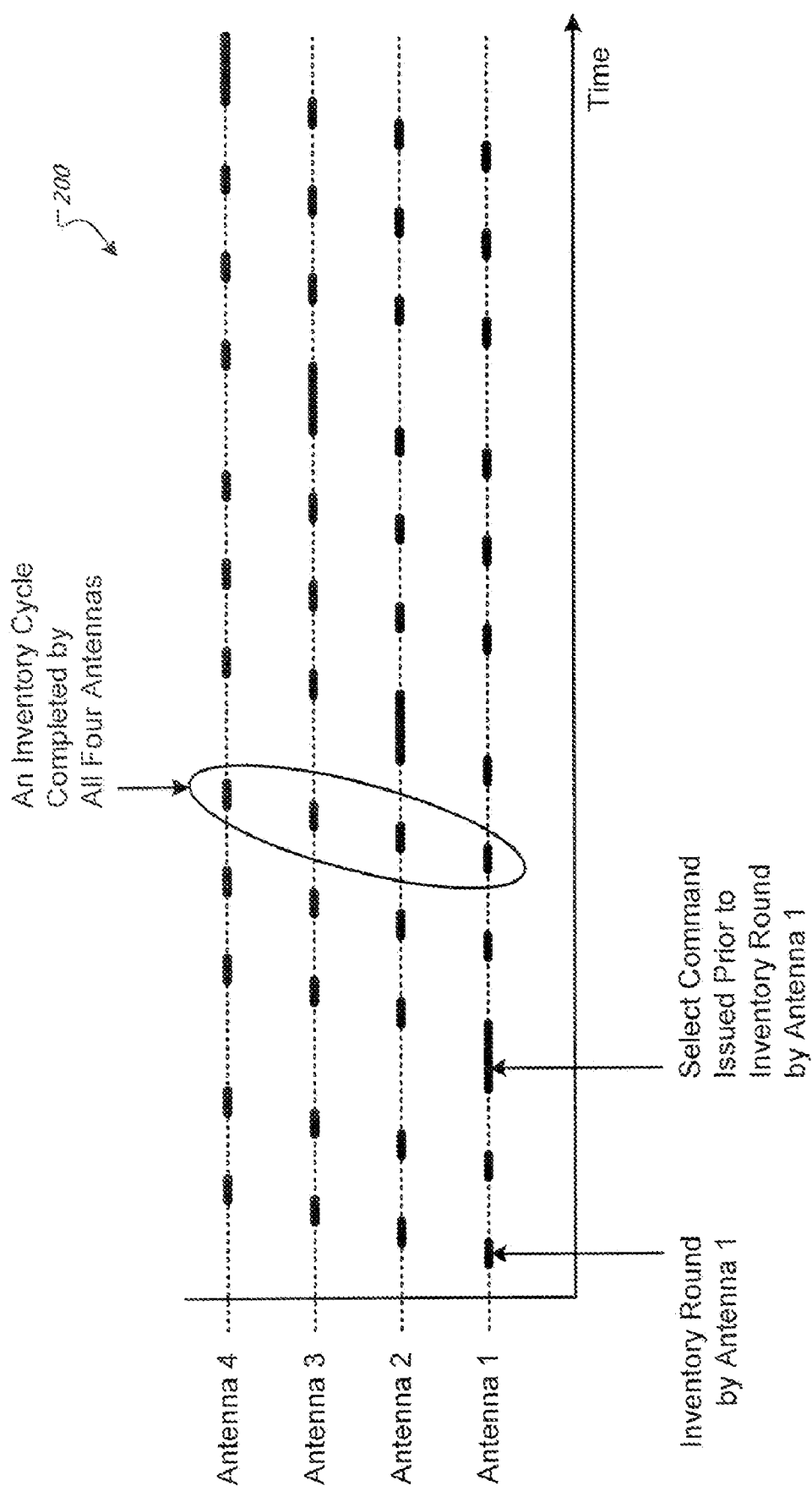
FIG. 2 is a distribution of signals transmitted by antennas of FIG. 1 in accordance with some implementations of the present disclosure.

FIG. 2 shows a distribution 200 of reader activity per antenna as a function of time for the disclosed algorithm. In some implementations, the disclosed algorithm avoids excessive read redundancy experienced in standard algorithms by only inventorying tags 104 in the A state, coupled with a periodic use of a command (e.g., the ISO-C "select" command) to periodically reset tags from the B state back into the A state. In some implementations, the reader 106 may transmit a B inventory frame that reads tags 104 in the B state and updates their states to A. The four antennas 110*a-d* (antennas are not labeled 110*a-d* in FIG. 2) successively read the RFID tags 104 as the pallet 102 passes through the portal. At a particular interval, the first antenna 110*a* Issues a select command prior to reading the tags 104 during its inventory round (indicated by the longer bold line). The select command instructs the tags 104 being illuminated to switch from the B state to the A state. After a predetermined number of inventory rounds, the second antenna 110*b* issues a select command prior to its inventory round. Thereafter the third and fourth antennas 110*c* and 110*d* also issue the select command, as shown in FIG. 2. Preferably, the number of inventory rounds P for issuing the select command is a number prime to M, the number of antennas, such as 13 and 17. Stated another way, a select command can be issued every P inventory cycles. It may be seen that in the implementation shown in FIG. 2, a select command can be issued every third inventory cycle, during which one of the antennas 110 issues the select command. In some implementations, the antennas 110 take turns in issuing the select commands. It may be seen that the select commands can be distributed evenly across the four antennas so that any tags 104 left in the B state by other readers (which are generally strong tags toward the outside of the pallet) are also read.

The use of the select command yields a small amount of read redundancy, although the primary purpose of this can be to ensure that tags spuriously read by other readers, and left by those readers in the B state, can be read at the portal. The reduction on read redundancy has several benefits. Inventory rounds are smaller and faster, which causes more frequent "query" commands, which makes it more likely for weak tags to participate. The smaller rounds leads to more frequency antenna switching, which increases the likelihood of identifying tags which may only be illuminated for a short period of time.

In another implementation, when a reader 106 starts an inventory round it issues a "query" command, which can include several arguments. In particular, the session number (0, 1, 2, or 3), the targeted session inventory flag value (A or B), and the size of the round ($2^Q$, where $0 \leftarrow Q \leftarrow 15$, and the round consists of $2^Q$ slots) are included. In response to the query command, tags 104 which receive the query command and have session inventory flag values matching the query command, generate a random number between 0 and $2^Q-1$. The generated random number can be the slot number for the tags to respond in. If the round size, $2^Q$, can be too large there can be too many slots for the number of tags (a lot of empty slots=a lot of wasted time), while picking a Q value that is too small can mean not enough slots for the number of tags (a lot of collision slots=a lot of wasted time).

When a "select" command is issued, many tags 104 can reset their session flag to the A state. The subsequent inventory round can be rather huge, so a larger value of Q can be used. The number of tags participating in the next inventory round on the next antenna can be much smaller, consisting mostly of new tags 104 that have entered the illumination pattern 108 since the last time that antenna 110 was sampled. Since the select command was just issued on the previous antenna 110, there may be slightly higher number of tags (because it took a little longer to get to it). After one complete cycle through, the antennas 110, the number of new tags on each antenna 110 can be fairly small. Therefore, an algorithm that chooses Q intelligently, based on when select commands are issued, may be provided to make the process even more efficient.

Figure 3:
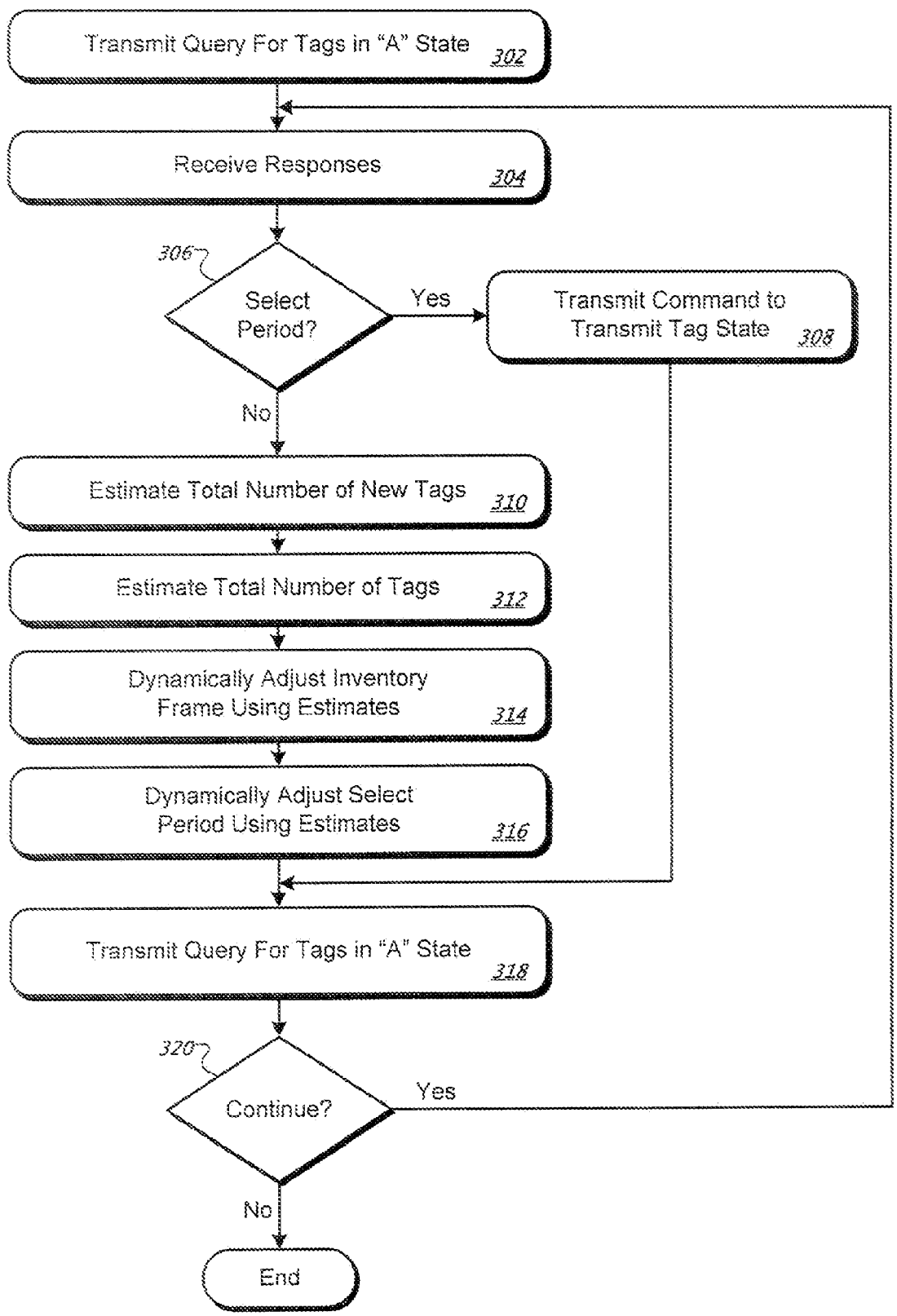
FIG. 3 is a flow chart illustrating an example method for interrogating tags in the interrogation system of FIG. 1.

FIG. 3 are flowcharts illustrating example methods 300 for interrogating RFID tags by dynamically switching singulation algorithms in accordance with some implementations of the present disclosure. Generally, method 300 describes an example technique where the tag states are periodically updated to increase read redundancy. System 100 contemplates using any appropriate combination and arrangement of logical elements implementing some or all of the described functionality.

Method 300 begins at step 302 where a query for tags in a first state is transmitted. For example, the reader 106 can transmit a request for identification information from tags in the A state. At step 304, responses to the query are received. In the example, the reader 106 receives a certain number of responses from tags 104 in the interrogation zone 108. If the select period is satisfied at decisional step 306, then, at step 308, a command is transmitted to update the tag states from the second state to the first state. Turning to the example, the reader 106 can transmit, a B inventory frame or a command (e.g., select command) to update tags 104 in the B state to the A state. If the select period is not satisfied, then the total number of new tags is estimated at step 310 and the total number tags in the inventory cycle are estimated at step 312. At step 314, the inventory frame is dynamically adjusted based, at least in part, on the estimated new tags and estimated total tags. The select period is dynamically adjust based, at least in part, on the estimated new tags and estimated total tags at step 316. For example, the reader 106 may update the select period for transmitting the B inventory frame or command after a certain number of inventory frames. At step 318, a query for tags in the A state is transmitted. If execution continues at decisional step 320, then execution returns to step 304. Otherwise, execution ends.

A number of embodiments of the invention have been described. Nevertheless, it will be understood that various modifications may be made without departing from the spirit and scope of the invention.

What is claimed is:

1. A method for interrogating RFID tags, comprising: estimating an expected number of tags in an inventory cycle using a first singulation algorithm based, at least in part, on tag numbers determined in one or more previous inventory cycles; transmitting requests to a plurality of RFID tags for information associated with RFID tags in a specified state while in an interrogation zone; and dynamically switching from the first singulation algorithm to a second singulation algorithm based on responses to the transmitted requests; and updating parameters of the second singulation algorithm to substantially maintain an average number of tags per inventory cycle approximately at a predefined number or less; wherein the first singulation algorithm comprising an A only singulation algorithm, the second singulation algorithm comprising an ABA singulation algorithm.

2. The method of claim 1, wherein the first singulation algorithm is associated with a select period for executing the first singulation algorithm, the method further comprising dynamically adjusting the select period based, at least in part, on the responses to the requests.

3. The method of claim 2, further comprising:
successively executing the first singulation algorithm for the select period; and
executing the second singulation algorithm in response to at least the select period being satisfied.

4. An RFID reader, comprising: a plurality of RF antennas configured to generate an interrogation zone; and a controller configured to: estimate an expected number of tags in an inventory cycle using a first singulation algorithm based, at least in part, on tag numbers determined in one or more previous inventory cycles; transmit requests to a plurality of RFID tags for information associated with RFID tags in a specified state while in the interrogation zone; and dynamically switch from the first singulation algorithm to a second singulation algorithm based on responses to the transmitted requests; and update parameters of the second singulation algorithm to substantially maintain an average number of tags per inventory cycle approximately at a predefined number or less; wherein the first singulation algorithm comprising an A only singulation algorithm, the second singulation algorithm comprising an ABA singulation algorithm.

5. The reader of claim 4, wherein the first singulation algorithm is associated with a select period for executing the first singulation algorithm, the reader further configured to dynamically adjust the select period based, at least in part, on the responses to the requests.

6. The reader of claim 5, further configured to:
successively execute the first singulation algorithm for the select period; and
execute the second singulation algorithm in response to at least the select period being satisfied.

* * * * *

UNITED STATES PATENT AND TRADEMARK OFFICE
CERTIFICATE OF CORRECTION

PATENT NO.        : 8,228,173 B2
APPLICATION NO.   : 11/767378
DATED             : July 24, 2012
INVENTOR(S)       : David Ross Missimer Page 1 of 1

It is certified that error appears in the above-identified patent and that said Letters Patent is hereby corrected as shown below:

Column 10, line 1, claim 1, before "dynamically" delete "and".

Column 10, line 27, claim 4, after "zone;" delete "and".

Signed and Sealed this
Second Day of October, 2012

David J. Kappos
*Director of the United States Patent and Trademark Office*